Figure 1:
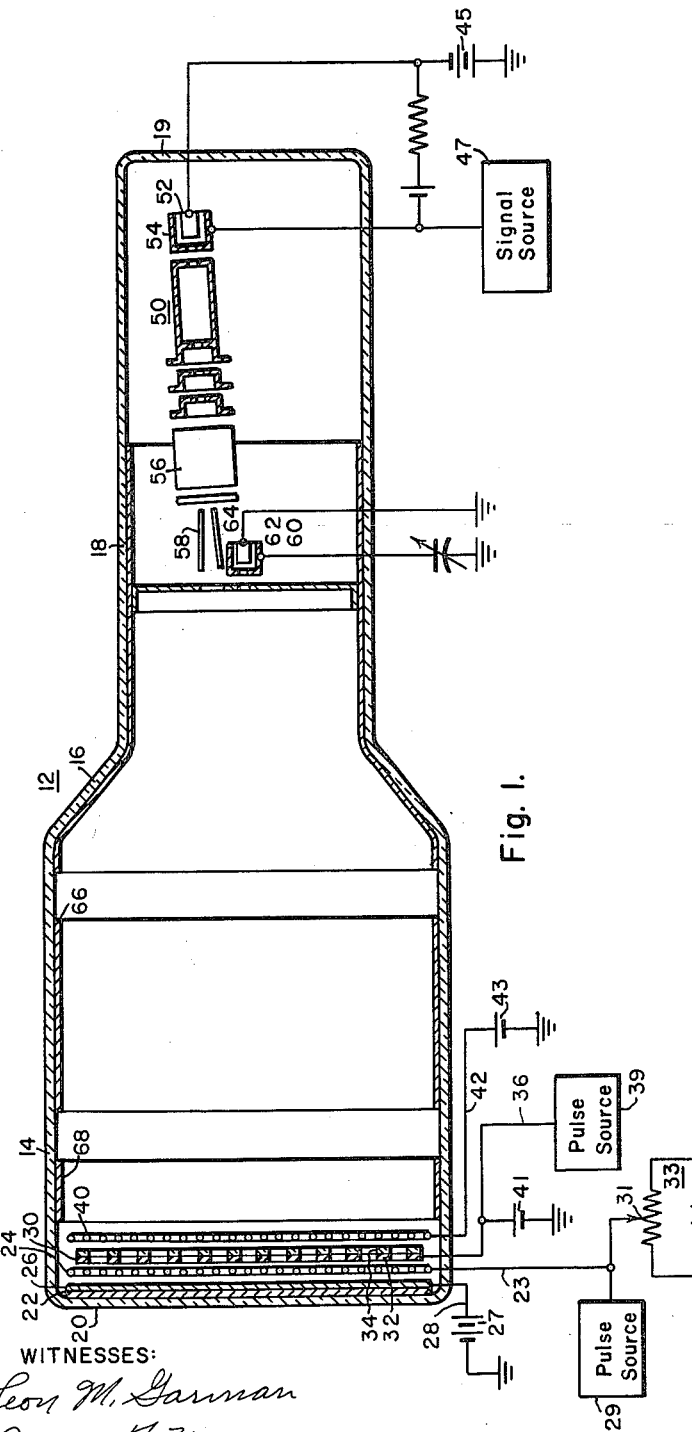

April 30, 1963   J. W. OGLAND ETAL   3,088,048

DIRECT VIEWING ELECTRONIC STORAGE SYSTEM

Filed April 7, 1960

WITNESSES:
Leon M. Garman
James F. Young

INVENTORS
Jon W. Ogland and
Arthur S. Jensen.
BY Charles F. Renz
ATTORNEY

3,088,048
DIRECT VIEWING ELECTRONIC STORAGE SYSTEM

Jon W. Ogland, Harundale, and Arthur S. Jensen, Baltimore, Md., assignors to Westinghouse Electric Corporation, East Pittsburgh, Pa., a corporation of Pennsylvania
Filed Apr. 7, 1960, Ser. No. 20,710
4 Claims. (Cl. 315—12)

This invention relates to display systems and more particularly to a direct viewing electronic storage system for presenting a series of applied electrical signals as a corresponding series of visual images, each of said visual images persisting until converted into the immediately succeeding visual image.

In many applications of radar, it is desirable to have an indicator tube wherein detection of targets is determined by the contrast ratio between the target and the screen background. The background brightness in these display tubes is caused by ambient brightness, noise and other disturbing signals applied to the display tube. When using a conventional cathode ray display tube, it is nearly impossible to produce the desired contrast and brightness required under high ambient light conditions, such as found at high altitudes in fighter airplanes.

Improved indicator tubes have relied on storage means and incorporated this into a direct viewing storage tube. These tubes have longer persistence which has the same effect on the eye of the observer as increased brightness. The persistence of the image may be electrically controlled and be made sufficient to produce a steady picture which the observer can scan with his eyes in searching for weak targets. The persistence of the image, however, should not be made so long that smearing of the image results due to the movement of the target. It is therefore, necessary in these direct viewing storage tubes to erase the image at a rate determined by the particular application. In some storage tubes, an erase gun is provided for erasing the image by scanning the electron beam across the storage surface in a similar manner to that used in writing the image on the storage target. It is, however, generally found more satisfactory to erase the whole screen at certain intervals by means of the viewing or reading gun which provides a flooding electron stream over the entire storage surface.

The usual procedure utilized in erasing an image from a storage screen is to pulse either the viewing gun cathode or the storage screen so that the voltage of the storage screen is momentarily made positive with respect to the viewing gun cathode. The electrons from the viewing gun will then land on the storage surface and discharge the written-in information. During this erase process, the phosphor display screen lights up to its maximum brightness causing a flash of light which disturbs the observer's eye adaptation. The reason for this flash is the fact that only a few of the electrons land on and discharge the storage mesh, whereas the greater number penetrate the mesh openings and are accelerated to the phosphor screen causing it to light up. To alleviate this problem, it has been found necessary to split the erase process up into many short periods of time occurring at a frequency higher than the flicker frequency of the eye. Instead of being disturbed by the individual erase flashes, the observer then sees a uniform steady background brightness of a magnitude determined by the duty cycle of the erase process. The resulting average background brightness reduces the contrast ratio and is very harmful for weak target detection by the observer. This harmful effect of background brightness on target detectability makes it imperative to perform erasure with the best possible efficiency by the best choice of erase voltage amplitude, wave shape and frequency. An efficient method of reducing this erase flash would be the switching or pulsing off the voltage applied to the phosphor screen. The voltage applied to the phosphor screen is of the order of 8 to 10 kilovolts and the pulsing of such high voltage naturally involves severe technical problems. It is also found that in attempting to pulse such high voltages that transients occur which disturb the proper function of the tube.

It is, accordingly, an object of this invention to eliminate the undesirable effects of the previous systems by utilizing means to prevent electron bombardment of the phosphor screen during the erase process by means operable at relative low voltage.

It is another object to provide an improved system for erasing information in a direct storage tube.

It is another object to provide an improved system to eliminate the loss of contrast in a display image with a storage tube due to operations performed in the erase procedure.

It is another object to provide an improved direct viewing storage tube.

Figure 2:
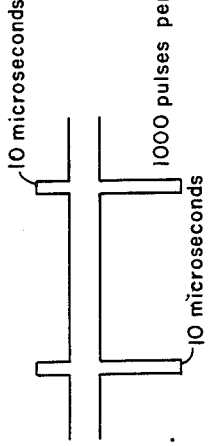

These and other objects are effected by this invention as will be apparent from the following description taken in accordance with the accompanying drawing throughout in which like reference characters indicate like parts, and in which:

FIGURE 1 is a schematic view of a direct view storage tube system embodying our invention; and FIG. 2 shows the phase relationship between the erase pulses applied to the storage screen and associated contrast grid.

Referring in detail to the drawings, there is shown in FIG. 1 a direct view storage tube comprising a sealed envelope 12 of a suitable material, such as glass. The envelope 12 is comprised of an enlarged cylindrically shaped portion 14 connected by a flared portion 16 to a substantially cylindrical shaped neck portion 18 of smaller diameter than said cylindrical portion 14. The cylindrical portion 14 is closed at its other end by a face plate portion 20 of suitable light transmissive material such as glass and the other end of the neck portion 18 is closed by a suitable base portion 19 containing lead-in members (not shown) for applying voltages to electrodes provided within the envelope 12. A coating 22 is provided on the inner surface of the face plate member 20. The coating 22 is the viewing or display screen and is of a suitable phosphor material which emits light in response to electron bombardment, such as zinc sulfide. The phosphor layer 22 is also provided with a conductive coating 26 of a suitable material, such as aluminum with a lead 28 connected to the exterior of the envelope. The lead 28 is connected to a suitable voltage source of about 10,000 volts, illustrated as a battery 27. The lead 28 is connected to the positive terminal of the battery 27 and the negative terminal of the battery 27 is connected to ground. Disposed adjacent to the phosphor screen 22 is a control or contrast grid 24 in the form of a mesh of suitable conductive material such as nickel with a lead 23 connected to the exterior of the envelope. The lead 23 is connected to a pulse source 29 which generates a negative pulse of about 20 to 200 volts magnitude at a pulse duration of about 10 microseconds and a repetition rate of about 1000 pulses per second or other duration and repetition frequency giving about the same aggregate erase duty cycle. Other values may also be used depending upon the speed of erasure deemed optimum for the particular application or situation. A suitable pulse source is Hewlett-Packard Pulse Generator 212A as described in their catalog 22-A, 1955. The lead 23 is also connected to a tap 31 of a potentiometer 33 which is connected across a battery 35 with its negative terminal connected to ground. Positioned adjacent to the contrast grid 24 is a storage grid 30. The storage grid 30 consists of an electrically conductive mesh 32 with a dielectric coating 34 provided on the side facing the writing and viewing electron guns, that is, the remote side of the mesh 32 with respect to the contrast grid 24. The conductive mesh 32 is also connected by means of a lead 36 to the exterior of the envelope. The lead 36 is connected to a pulse source 39 which generates a positive voltage pulse of about 15 volts in magnitude and synchronized to occur simultaneously with the pulses applied to the contrast mesh 24 and with the same pulse length and repetition rate. The source 39 may be similar to source 29 with modifications to provide a synchronized negative pulse. In practice, it is preferable to obtain the positive and negative pulses from opposite sides of a phase splitter driven by the same pulse generator. The lead 36 is also connected to the positive terminal of a voltage source shown as a battery 41 with the battery's negative terminal connected to ground. The battery 41 may be about 10 volts. The dielectric storage material in the coating 34 may be of any suitable material, such as magnesium fluoride or silica.

Positioned adjacent to the dielectric surface of the grid 30 is a collector mesh grid 40. The grid 40 is also of electrically conductive material with a lead 42 connected to the exterior of the envelope. The lead 42 is connected to the positive terminal of a battery 43 with the negative terminal connected to ground. The voltage of source 43 may be about 200 volts.

Positioned at the opposite end of the envelope 12 and within the neck portion 18 is a first electron gun 50 hereinafter called a "writing" gun for developing an electron beam and directing it onto the storage grid 30. The writing gun 50 is of any suitable construction to provide an electron beam of elemental cross sectional area and consists of at least a cathode 52 and a control grid 54. The cathode 52 may be connected to the negative terminal of a voltage source 45 of about 2000 volts with the positive terminal connected to ground. The control grid 54 is connected to a signal source 47 with a suitable bias as shown. The horizontal and vertical deflecting plates 56 and 58 are provided for directing the beam from the writing gun over the grid 30. Suitable deflection voltages from voltage sources (not shown) are applied to the plates 56 and 58 to deflect the beam in a manner well known to those skilled in the art.

Also positioned within the neck portion 18 of the envelope is a second electron gun structure 60 which may be referred to as the viewing gun and performs the function of reading and erasing information. The gun 60 provides a large area beam so as to substantially flood the entire area of the storage mesh 26. The flood gun 60 also consists of at least a cathode 62 and a control grid 64. The cathode 62 may be connected to ground potential. Conductive coatings 66 and 68 are provided usually on the interior surface of the envelope wall. The coating 66 and 68 collimates the paths of the electrons in the stream of electrons emitted from the flood gun 60. Collimation is required so that the low velocity electrons will approach the storage grid 30 in paths perpendicular to the storage grid 30. The coating 68 is usually positioned on the interior surface of the envelope adjacent the collector grid 40 and is electrically tied to the collector grid 40. This structure serves to accelerate electrons in the beam and also to repel positive ions from bombarding the storage grid 30. The collector grid 40 also accomplishes the function of collecting secondary electrons emitted from the storage grid 30.

In the writing operation, it is first necessary to establish a uniform potential over the surface of the storage surface of the grid 30. In operation, the conductive mesh 32 on the storage grid 30 is maintained at a quiescent voltage of about 5 volts positive with respect to ground by means of the battery 41. The pulse generator 39 provides a positive pulse to the storage grid during erase which may be about 15 volts and during application of this pulse the dielectric storage surface of the storage grid facing the flooding gun 60 is charged to the potential of the cathode 62 of the flood gun 60, which is defined as ground potential. The potential difference across the dielectric layer 34 is now about 20 volts. At the end of the positive erase pulse, the backing electrode 32 returns to its initial positive direct current potential of 5 volts, but the charge stored in the dielectric changes the potential of the storage grid surface from zero to a negative potential nearly equal to 15 volts or the amplitude applied positive pulse. This voltage is usually sufficient to cut off the storage tube.

The writing gun 50 is similar to that used in connection with cathode ray tubes and produces a well defined focused beam having a small effective area at the storage grid 30. The cathode 52 of the writing gun 50 is generally operated at a potential of a negative 1500 to 2500 volts with respect to the viewing gun cathode, the potential of which is normally defined as ground potential. The signal source 47 modulates the control grid 54 of the writing gun 50 in accordance with the information to be written onto the storage grid 30. The collector grid 40 is operated at a positive potential of about 200 volts. The writing beam electrons landing on the storage grid 30 have sufficient velocity to produce a secondary electron emission ratio greater than unity. Thus, more electrons leave the storage grid 30 than arrive and these elements on the storage grid scanned by the beam assume a less negative charge wherever the writing beam strikes. The emitted secondary electrons are attracted and collected by the collector grid. Thus, the storage elements may be charged to any potential intermediate between the storage grid cutoff voltage, which in the specific embodiment discussed here is negative 15 volts, and zero potential. In this manner, a storage pattern may be written on the storage grid 30 by the writing gun 50 in accordance with the modulation applied to the control grid of the writing gun from the signal source 47.

In the viewing operation, the viewing gun 60 provides a low velocity electron stream which continuously floods the collector grid 40 and storage grid 30. A display with exceptional brightness is possible because of the high viewing gun current. The high current can be obtained because the viewing beam is not controlled by methods ordinarily employed in cathode ray tube guns and consequently is not limited by focusing, deflection and other modulation requirements. The conductive coatings 66 and 68 collimate the paths of the electrons in the stream before they reach the storage grid 30. It is necessary that these low velocity electrons in the viewing beam approach the storage grid 3 in paths perpendicular to the storage grid 30. The collector grid 40 and associated coating 68 serve to accelerate electrons in the viewing beam and to repel any positive ions, which are generated within the volume between the electron gun and the collector grid, from landing on the storage grid 30 and wiping out the stored charge pattern.

The potential on any storage element of the storage grid 30 determines the number of the viewing beam electrons passing through the apertures in storage grid 30 in the immediate vicinity of the element. When potential of the storage grid is such as to allow passage of the electrons, these electrons are accelerated by the voltage applied to the viewing screen 22 and strike the screen 22 directly opposite the storage element. As a result, there is produced on the display screen 22 an image corresponding to the storage pattern written on the storage grid 30. Thus, in those areas where the writing beam did not modify the charge from the negative 15 volts, the electrons will not pass through the apertures in the storage grid 30, but will be repelled and collected by the collector. In those areas where the potential is reduced from the negative 15 volts, electrons will pass through the apertures and be accelerated to the screen 22. The display screen 26 may be operated at a potential of the order of 10,000 volts supplied from the battery 27. The contrast or control grid 24 which normally operates at a potential of about 200 volts may be varied by use of the potentiometer 33 to vary the brightness and contrast of the viewed image.

The viewing time of this stored image depends on the particular application and may be as high as 60 seconds. In our specific application, the erase pulse sources provide 1000 pulses per second with pulse length of 10 microseconds and a pulse amplitude of 15 volts. This gives a retention time of 30 seconds.

In the erase operation, a positive pulse of 15 volts is applied to the back plate 32 of the storage grid 30 from the positive pulse source 39. Simultaneously, with the application of this pulse to the storage grid 30, a negative pulse of similar time duration and repetition and of the order of 20 to 200 volts is applied to the contrast control grid 24 from the negative pulse source 29. Thus, the stored pattern on the storage grid 30 may be erased by applying to the backing electrode 32 a positive pulse or a series of positive pulses having sufficient amplitude and duration to permit storing a charge in the dielectric between the backing electrode 32 and the storage surface of the grid 30 to drive the storage surface potential negative beyond the cutoff voltage as previously explained. However, in the normal tube when this positive pulse is applied to the backing plate of the storage grid, the flood electrons not only land on the storage surface and discharge the surface toward cutoff potential, but also permits the passage of electrons through the storage grid during this erase time resulting in a bright flash from the display screen. By positioning the contrast control grid 24 between the storage grid 30 and the phosphor screen 22 and in close proximity to the backing electrode 32, it is found that by applying a small negative pulse of voltage of about 20 to 200 volts simultaneously with the application of the positive erase pulse to the storage grid 30 that this bright flash on the screen can be prevented. It is also found that by application of this negative pulse from the source 29 to the contrast control grid 24 that the erase procedure is also speeded up by making more of the electrons from the flood gun available for discharging the storage surface of the storage grid 30. It is obvious that the erase processes now show up as dark periods on the display screen 22 and contrast is substantially improved. Also, by choosing the proper erase rate, that is, above flicker frequency, the erase will not be perceived by the observer. A good contrast ratio is thus obtained and maintained between the pulsing such as to reduce the background brightness rather than increasing it. Since the storage mesh 30 and the contrast grid 24 need not be registered to obtain the operation described above, the grid 24 is easily mounted within a storage tube by fastening it to the backing electrode 32 separated by a low voltage insulating ring around its periphery.

An alternative structure is to provide the contrast grid 24 as a conductive coating on one side of an insulating mesh, for example, of photoformed glass, while the backing electrode 32 may be a conductive coating on the other side of the insulating mesh. The dielectric coating 34 would be applied to the backing electrode 32 as in the first embodiment.

While the present invention has been shown in only one embodiment, it will be obvious to those skilled in the art that it is not so limited but is susceptible of various changes and modifications without departing from the spirit thereof.

We claim as our invention:

1. A direct view storage tube comprising a storage grid, a luminescent screen positioned on one side of said storage grid, a contrast control grid positioned between said storage grid and said luminescent screen, a flood gun positioned on the opposite side of said storage grid with respect to said luminescent screen, the cathode of said flood gun operating at a first potential, said storage grid comprised of a conductive mesh with a dielectric coating on the side facing said flood gun, a pulse generator for supplying erasing pulses to said storage grid and a second pulse generator for supplying voltage pulses negative with respect to said first potential to said contrast control grid such that said pulses are applied to said electrodes simultaneously.

2. A direct viewing storage device comprising a storage grid, said grid comprised of an electrically conductive mesh having a dielectric coating on one surface, means to produce a charge pattern on said storage grid corresponding to information to be presented, said means including a first electron gun facing the dielectric surface of said grid for producing a writing electron beam modulated in accordance with information representative signals and directed onto said storage grid, a viewing screen, a contrast control positioned between said storage grid and said viewing screen, means including a second electron gun for producing a flood of electrons for rendering said charge pattern visible on said viewing screen, said second electron gun having its cathode at a first potential, means for applying voltage erase pulses positive with respect to said first potential to said storage grid and means for simultaneously applying pulses negative with respect to said first potential to said contrast control grid to prevent electrons from passing from said storage grid to said viewing screen during said erase pulse.

3. A direct view storage device comprising a storage grid, said grid comprised of an electrically conductive mesh having a dielectric coating on one side, means for producing a charge pattern on said storage grid corresponding to information to be presented, said means including a first electron gun positioned on the side of said storage grid facing said dielectric coating for producing a writing electron beam modulated in accordance with information representative signals, a viewing screen, a contrast control grid positioned between said viewing screen and said storage grid, means including a second electron gun for producing a flood of electrons for rendering said charge pattern visible to said viewing screen, a pulse generator electrically connected between said storage grid and the cathode of said second electron gun, said pulse generator supplying erasing pulses to said storage grid when said second electron gun operates as an erasing gun and means including a pulse generator electrically connected to said contrast control grid, said second pulse generator generating a voltage pulse having a period equal to that of said erase pulses.

4. In a direct view storage tube having at least a storage grid, a luminescent screen and a contrast control grid positioned between said storage grid and said luminescent screen, said storage grid comprised of an electrically conductive mesh having a storage layer on the side of said mesh remote to said screen, a pulse generator connected to said storage grid, said pulse generator supplying erase pulses to said storage grid and a second pulse generator connected to said contrast control grid, said second pulse generator supplying pulses negative with respect to said erase pulses and having a period substantially equal to that of said erasing pulses, the frequency rate of said pulse generators being such that the visual presentation on said luminescent screen of information on said storage grid appears to be continuous.

References Cited in the file of this patent

UNITED STATES PATENTS

| | | |
|---|---|---|
| 2,790,929 | Herman | Apr. 30, 1957 |
| 2,818,524 | Smith | Dec. 31, 1957 |
| 2,879,442 | Kompfner et al. | Mar. 24, 1959 |
| 2,931,938 | Patrick | Apr. 5, 1960 |
| 2,953,711 | Taubenslag | Sept. 20, 1960 |